United States Patent [19]

Fujiwara et al.

[11] Patent Number: 5,329,390
[45] Date of Patent: Jul. 12, 1994

[54] LIQUID CRYSTAL DISPLAY ELEMENT OF OPTICAL WRITING TYPE WITH LIGHT ABSORBING LAYER INCLUDING INORGANIC PIGMENT AND LEVELING LAYER

[75] Inventors: Sayuri Fujiwara; Akitsugu Hatano, both of Nara, Japan

[73] Assignee: Sharp Kabushiki Kaisha, Osaka, Japan

[21] Appl. No.: 887,738

[22] Filed: May 22, 1992

[30] Foreign Application Priority Data

May 23, 1991 [JP] Japan .................. 3-118821

[51] Int. Cl.⁵ .................. G02F 1/135; G02F 1/1335
[52] U.S. Cl. .................. 359/67; 359/72
[58] Field of Search .................. 359/67, 72

[56] References Cited

U.S. PATENT DOCUMENTS

| | | | |
|---|---|---|---|
| 5,056,895 | 10/1991 | Kahn | 359/71 |
| 5,084,777 | 1/1992 | Slobodin | 359/67 |
| 5,142,391 | 8/1992 | Fujiwara et al. | 359/67 |
| 5,153,759 | 10/1992 | Haas et al. | 359/67 |
| 5,233,450 | 8/1993 | Hatano et al. | 359/72 |

FOREIGN PATENT DOCUMENTS

| | | |
|---|---|---|
| 0329427 | 8/1989 | European Pat. Off. . |
| 0329428 | 8/1989 | European Pat. Off. . |
| 0454480 | 10/1991 | European Pat. Off. . |
| 4-134324 | 5/1992 | Japan . |
| 2161952A | 1/1986 | United Kingdom . |

OTHER PUBLICATIONS

Latham et al, "A Silicon Liquid-Crystal Spatial Light Modulator", GEC Journal of Research (Incorporating Marconi Review), vol. 4, No. 3 (1986), pp. 219-222.

*Primary Examiner*—Anita P. Gross
*Attorney, Agent, or Firm*—David G. Conlin; George W. Neuner

[57] ABSTRACT

A liquid crystal display element of optical writing type is arranged to have a first transparent substrate, a first transparent electrode layer formed on the first substrate, a photoconductive layer formed on the electrode layer, a light absorbing layer formed on the photoconductive layer, a dielectric layer formed on the light absorbing layer, a second transparent substrate, a second transparent electrode layer formed on the second substrate, and a liquid crystal layer sealed between the second transparent electrode layer and the dielectric layer. The light absorbing layer is formed of a material having pigment dispersed in an organic material, so as to eliminate the necessity of patterning the light absorbing layer. The pigment may be a carbon black or an inorganic material in an acrylic resin, for example. The liquid crystal display element further includes a leveling layer formed on the light absorbing layer.

16 Claims, 5 Drawing Sheets

LIQUID CRYSTAL DISPLAY ELEMENT OF OPTICAL WRITING TYPE WITH LIGHT ABSORBING LAYER INCLUDING INORGANIC PIGMENT AND LEVELING LAYER

BACKGROUND OF THE INVENTION

1. Field of the Invention

The present invention relates to a liquid crystal display element of optical writing type which includes a light absorbing layer formed of an organic material having pigment dispersed therein for the purpose of making the manufacturing process easier.

2. Description of the Related Arts

The present inventors know a liquid crystal display element of optical writing type which has the following arrangement. A first transparent electrode is formed on a first glass substrate. On this first transparent electrode, a photoconductive layer is formed of a hydrogenated amorphous silicon (a-Si:H). On this photoconductive layer, a light absorbing layer is formed of a patterned thin film of carbon or metal such as silver. On this light absorbing layer, a dielectric mirror is formed of multiple layered films of titanium dioxide/silicon dioxide, zinc sulfide/magnesium fluoride, for example. On this dielectric mirror, a first orientation film is formed of a polyimide film.

On the other hand, a second transparent electrode is formed on a second glass substrate. On this second transparent electrode, a second orientation film is formed. The first and second glass substrates, on which these films are thus formed, are attached to each other through a spacer, and a liquid crystal is disposed between the first and second orientation films, so as to seal the liquid crystal layer therebetween.

Then, a projection light, that is, a light for reading out an image written in the liquid crystal layer, is applied to the liquid crystal display element from the side of the second glass substrate. The dielectric mirror is provided for the purpose of reflecting the projection light toward the outside and, at the same time, preventing the projection light from entering the photoconductive layer by reflecting the projecting light with a high reflection coefficient. The light absorbing layers are provided for preventing the projecting light from being reflected toward the photoconductive layers again and, at the same time, screen the projection light transmitted through the dielectric mirror.

That is, the projection light passes through the liquid crystal and is reflected from the dielectric mirror to the outside. Since the dielectric mirror has a reflectivity of about 95%, however, about 5% of the projection light is transmitted through the dielectric mirror. When the light is incident to the overall surface of the photoconductive layer, the image data being written by a writing light is erased. To prevent such a disadvantage, the light absorbing layers are provided between the dielectric mirror and the photoconductive layer. The light incident on the liquid crystal display element normally has an intensity of about 1 W. On the other hand, if the photoconductive layer is formed of a hydrogenated amorphous silicon (a-Si:H), light having an intensity of several tens $\mu$W or more may vary the conductivity of the photoconductive layer. To avoid the variation of the conductance, it is necessary to lower the intensity of the light incident on the photoconductive layer by four to five orders of magnitude through the effect of the dielectric mirror and the light absorbing layer.

One method for lowering the intensity is necessary to enhance the reflectivity of the dielectric mirror. For this purpose, however, the dielectric mirror needs to have more layers. This results in making the dielectric mirror thicker, thereby making it difficult to apply a sufficient voltage to the liquid crystal.

The known liquid crystal display element, therefore, includes (a) light absorbing layer formed of a thin film such as carbon or metal (e.g. silver) for the purpose of lowering the intensity of the incident light by four or more digits.

The light absorbing layer formed of a film such as carbon or metal (e.g. silver) has so high conductivity that the layer needs to be patterned. Patterning of the layer makes the manufacturing process more difficult for obtaining a high resolution. Moreover, the adhesion properties between the metal film such as carbon or silver and the hydrogenated amorphous silicon (a-Si:H) are not so good that the light absorbing layer may be more easily stripped off the photoconductive layer.

SUMMARY OF THE INVENTION

It is, therefore, an object of the present invention to provide a liquid crystal display element of optical writing type which is allowed to be manufactured by the simple manufacturing process without having to pattern the component layer and providing an excellent resolution.

In carrying out the object, a liquid crystal display element of optical writing type includes: a first transparent substrate; a first transparent electrode layer formed on the first transparent substrate; a photoconductive layer formed on the first transparent electrode layer; a light absorbing layer formed on the photoconductive layer, the layer being formed of pigment dispersed in an organic material; a dielectric layer formed on the light absorbing layer; a second transparent substrate; a second transparent electrode layer formed on the second transparent substrate; and a liquid crystal layer sealed between the second transparent electrode layer and the dielectric layer.

In operation, the light absorbing layer employs a film formed by dispersing pigment (organic pigment or inorganic pigment) in an organic material. This results in making the manufacturing process simpler, thereby easily obtaining the liquid crystal display element of writing type with a higher resolution.

Further objects and advantages of the present invention will be apparent from the following description of the preferred embodiment of the invention as illustrated in the accompanying drawings.

DESCRIPTION OF THE PREFERRED EMBODIMENTS

The description will be directed to an embodiment of the present invention with reference to the drawings.

Figure 1:
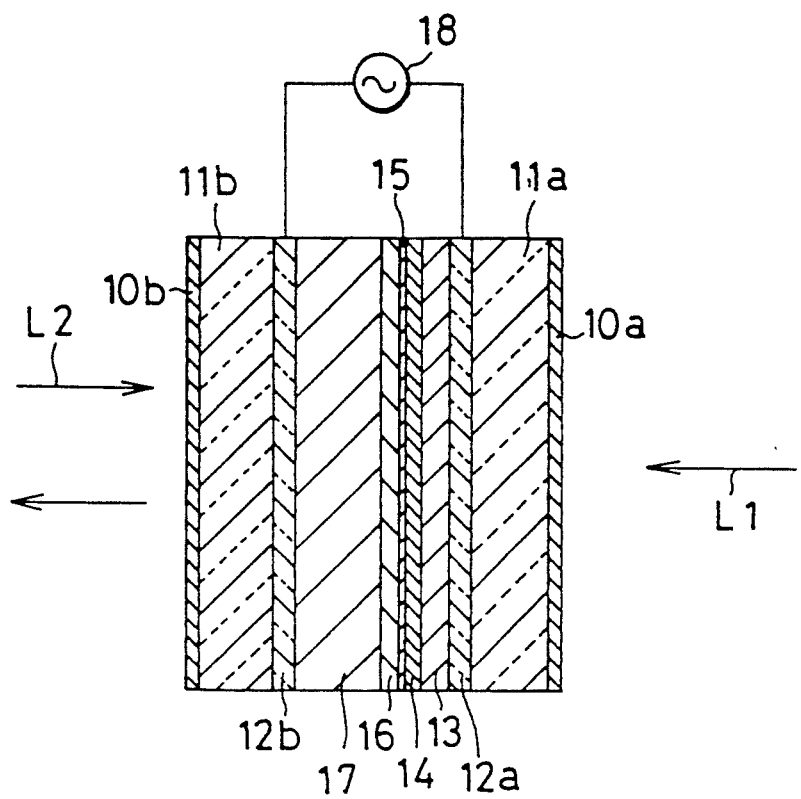
FIG. 1 is a sectional view showing a liquid crystal display element of optical writing type according to an embodiment of the present invention.

FIG. 1 is a sectional view showing a liquid crystal display element of optical writing type according to an embodiment of the invention. This liquid crystal display element of optical writing type may be preferably used for some devices such as a liquid crystal display apparatus of projection type, an image scanner sensor and a near infrared to visible light converting element.

As shown in FIG. 1, $11a$ is a glass substrate on which a transparent electrode film $12a$ is disposed. The transparent electrode film $12a$ is composed of an ITP (Indium Tin Oxide) transparent conductive film and an $SiO_2$ (Silicon Oxide) transparent conductive film disposed thereon. This transparent electrode film $12a$ is formed on the glass substrate $11a$ by means of the sputtering technique.

The liquid crystal display element is also provided with a photoconductive layer 13, which is formed of a hydrogenated amorphous silicon (a-Si:H) with a film thickness of about 3 μm, on the transparent electrode film $12a$. The photoconductive layer 13 is formed by means of a plasma CVD technique using a silane gas ($SiH_4$) and a hydrogen gas ($H_2$) as a material gas. In place of the hydrogenated amorphous silicon, a hydrogenated amorphous silicon carbide (a-SiC:H) may be used for forming the photoconductive layer 13. The film formed of a-SiC:H is formed by means of a plasma CVD technique using a silane gas ($SiH_4$), a methane gas ($CH_4$) and a hydrogen gas ($H_2$) as a material gas.

On the photoconductive layer 13, there is disposed a light absorbing layer 14. This light absorbing layer 14 is formed of a coating material of carbon dispersed type, as one kind of organic pigment, that is, an organic material having organic pigment such as carbon black dispersed therein. The light absorbing layer 14 is formed by means of a spinner-coating technique using the coating material of carbon dispersed type, photo-polymerizing it by a light exposure, and then burning it for 1 hour at a burning temperature of 220° C. This coating material of the carbon dispersed type, is made by dispersing the carbon black in an acrylic resin, and is formed to be a film with a film thickness of about 1.5 μm, with a resistivity of about $10^7$ Ω·cm, and with a transmittance of about 0.3% with respect to the visible light range.

Figure 2:
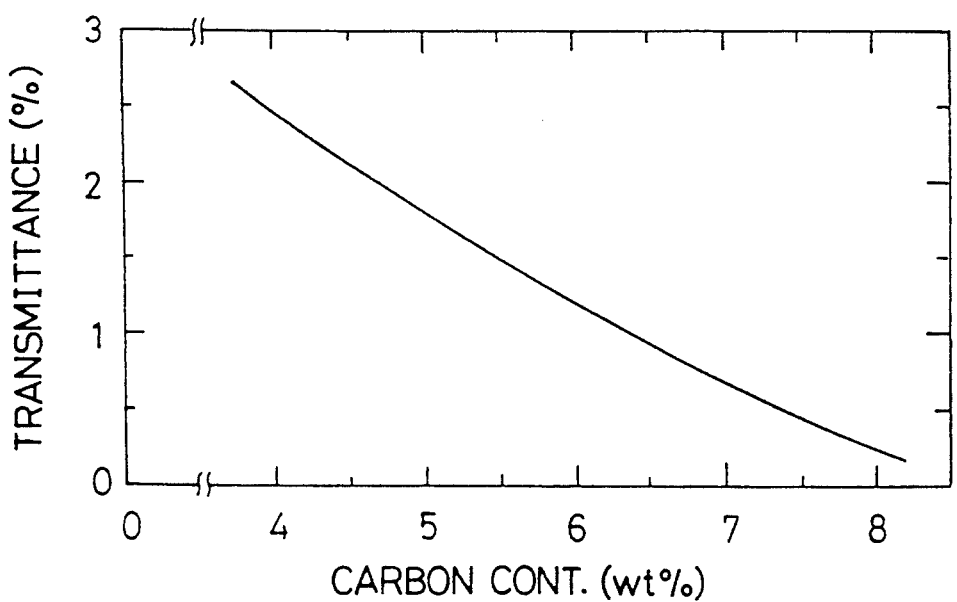
FIG. 2 is a graph showing a relation between transmittance and the content of dispersed carbon.
Figure 3:
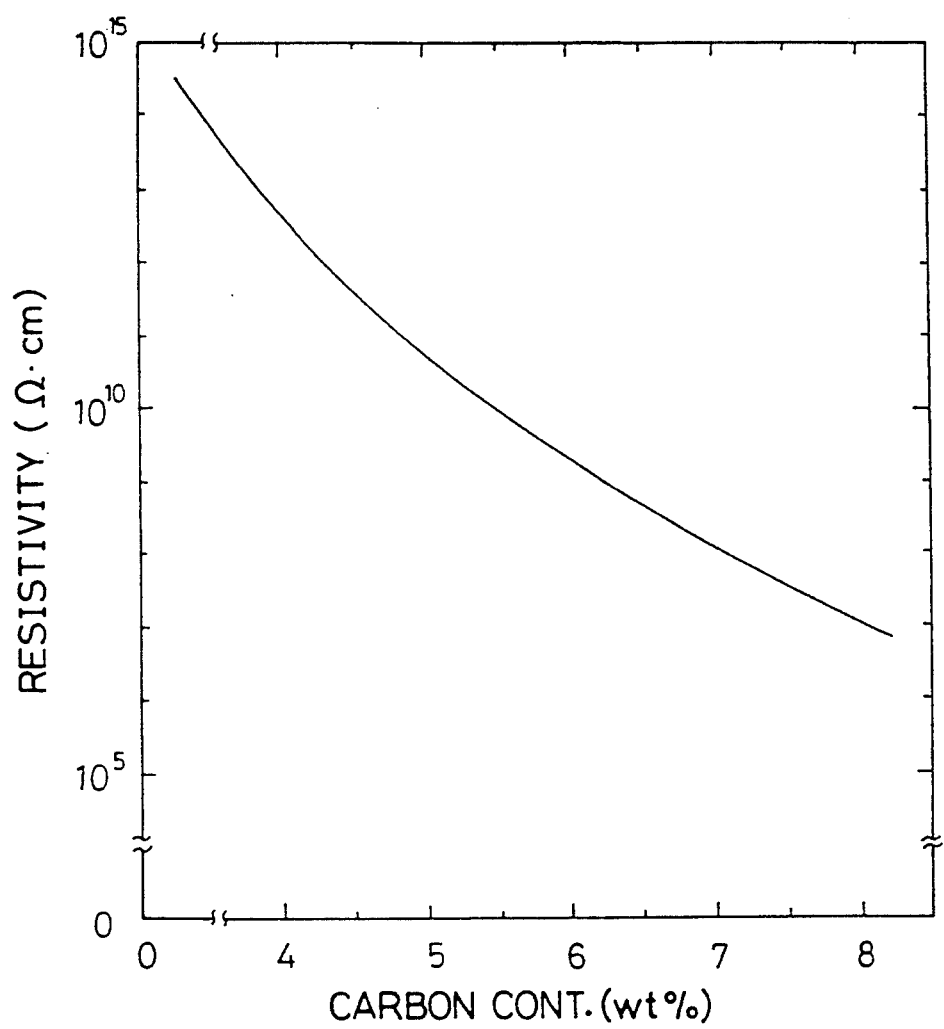
FIG. 3 is a graph showing a relation between resistivity and the content of dispersed carbon.

As shown in FIGS. 2 and 3, this kind of coating material of the carbon dispersed type may change the transmittance and the resistivity according to the content of the dispersed carbon. If this kind of material is used as a light absorbing layer, the transmittance is preferably 0.5% or lower and the resistivity is $10^6$ Ω·cm or more. The present applicants have proposed a liquid crystal display element of optical writing type, which is provided with such a light absorbing layer made of coating material of the carbon dispersed type, in the Japanese lying open No. Hei4-9925.

As described above, in this embodiment, the organic pigment, carbon black, is used as a pigment. It is possible to employ an inorganic pigment having a larger resistivity ($\rho \geq 10^{11}$ Ω·cm). If the inorganic pigment is used, it is necessary to select the pigment according to the way of use, because the light screening characteristic is variable according to the light-screened range. For example, the black has a light shield characteristic of the overall visible range, the yellow and brown have a light shield characteristic of ~500 nm, the green has a light shield characteristic of 600 to 700 nm, and the blue has a light shield characteristic of 540 to 640 nm. As an inorganic material, the black material is formed of a combination of oxides of copper, chrome, iron, magnesium, and cobalt. The yellow material is formed of a combination of oxides of titanium, barium, nickel, antimony, and chrome. The brown material is formed of a combination of oxides of iron, zinc, titanium, chrome, nickel, and aluminium. The green material is formed of a combination of oxides of titanium, zinc, nickel, cobalt, aluminium, lithium, chrome and calcium. The blue material is formed of a combination of oxides of cobalt, aluminium, zinc, silicon, titanium, lithium, and chrome.

On the light absorbing layer 14, a leveling layer 15 is formed. The leveling layer 15 is formed by coating a protective film, semicoffine (Registered Trademark; product by Toray Ind., Inc.), one kind of polyimide, with a spinner, preliminary sintering the coated film for ten minutes at 100° C., and sintering the coated film for one hour at 220° C. The thickness of the leveling layer 15 is about 1.0 μm. The leveling layer 15 may uses an acrylic system or polysiloxane in place of polyimide. A hardening method employs a light hardening method in place of the heat hardening method. The present applicants have proposed a liquid crystal display element of optical writing type which includes such a leveling layer in the Japanese Patent Application No. Hei 2-255981 (filed in Sep. 26, 1990).

On the leveling layer 15, a dielectric layer 16 is disposed. The dielectric layer serves as a reflecting layer. The dielectric layer 16 is formed by alternately laminating silicon oxide ($SiO_2$) and titanium oxide ($TiO_2$) with an EB vapor-depositing technique. The thickness of the film is about 2 μm and the reflectivity is about 99%. Since the dielectric layer 16 is evaporated on the light absorbing layer 14, the temperature of the substrate should be preferably limited to 250° C. or lower, if possible, 200° C. or lower.

On the dielectric layer 16, a liquid crystal layer 17 is disposed. As the liquid crystal layer 17, a scattering type liquid crystal compound film is utilized here. This liquid crystal compound film is formed as follows. Namely, a homogeneous solution is made by mixing 30 wt % of bifunctional acrylate (HX-620 product by Nippon Kayaku Co., Ltd.) which is a UV (ultraviolet) polymerization compound. 70 wt % of nematic liquid crystal (ZLI-3201-000 product by Merck Co., Inc.), and a small amount of polymerization initiator (Darocure 1173 product by Merck Co., Inc.), and is filtered. Then, the filtered solution is spinner-coated onto the light reflecting layer 25 with a film thickness of 10 μm, and is exposed by ultra-violet ray so as to photo-polymerize it.

On the liquid crystal layer 17, an opposing layered body of a transparent electrode film $12b$ and a glass substrate 11b is disposed. This opposing layered body is formed as follows. Namely, the transparent electrode film 12b is formed of an ITO transparent conductive film on the glass substrate 11b by means of a spattering technique.

On the outer surfaces of the glass substrates 11a and 11b, reflection preventing films 10a and 10b are respectively formed, in order to prevent the light reflection on these outer surfaces of the glass substrates 11a and 11b, by means of a vapor-depositing technique. The liquid crystal display element is adapted such that an alternating voltage can be applied between the transparent electrode films 12a and 12b by an alternating voltage source 18.

In a condition that this alternating voltage is supplied from the alternating voltage source 18, when a laser beam L1 is inputted to the liquid crystal display element from the side of the glass substrate 11a, the impedance of the photoconductive layer 13 is reduced at an area that receives the laser beam L1, so that the alternating voltage supplied by the voltage source 18 is applied to the liquid crystal layer 17, and the orientation of the liquid crystal molecules is changed at this area. On the other hand, at another area that does not receive the laser beam L1, the impedance of the photoconductive layer 13 is not changed, so that the liquid crystal molecules in the liquid crystal layer 17 keep its original orientation condition. As a result, an image corresponding to the incident light is formed in the liquid crystal layer 17.

In the above mentioned embodiment, an acrylic resin is utilized as the coating material of the carbon dispersed type for the light absorbing layer 14. A polyimide or a polyamide can be utilized as a photo-polymerizing type, and an epoxy resin can be utilized as a heat-polymerizing type for the light absorbing layer 14.

As a liquid crystal display mode of the liquid crystal layer 17, if a nematic liquid crystal is used, any one of a dynamic scattering mode and a guest host mode can be used in place of the liquid crystal compound film disclosed in this embodiment. If a smectic liquid crystal is used, the guest host mode can be utilized. As the substrate 11a, a fiber plate formed of optical fibers may be used.

Figure 4:
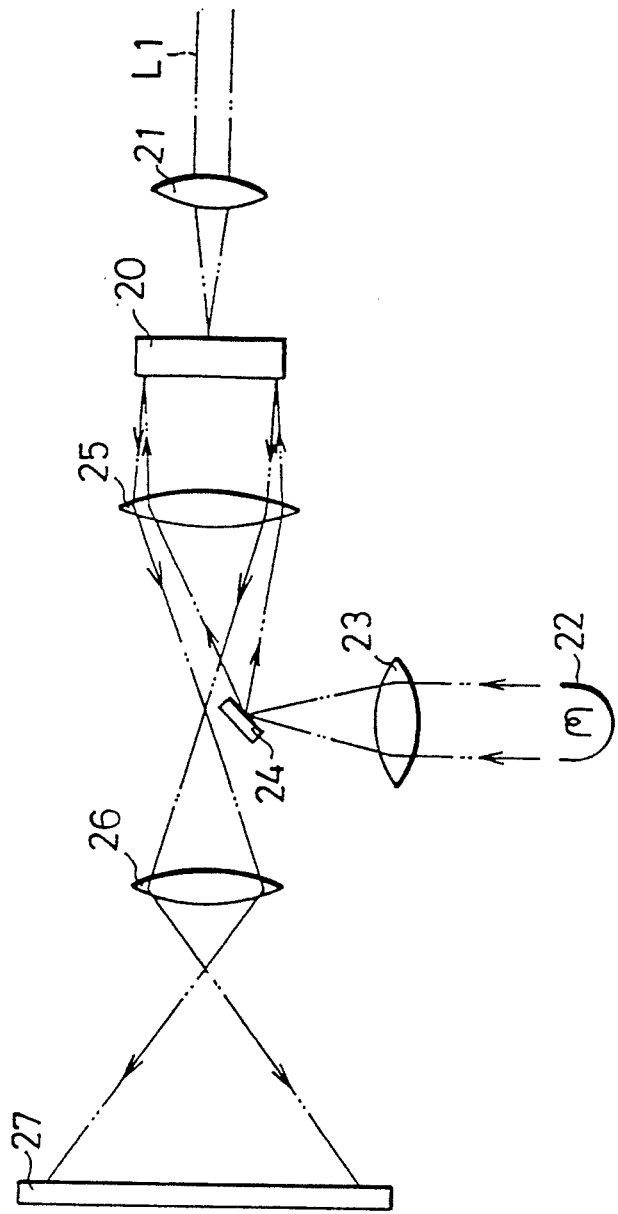
FIG. 4 is a schematic view showing a projection type display apparatus to which the liquid crystal display element of optical writing type shown in FIGS. 1 and 7 is used as a light modulator.

FIG. 4 is a schematic view showing a liquid crystal display apparatus of projection type in which the liquid crystal display element of optical writing type shown in FIG. 1 is used as a light modulator.

As shown, 20 is a liquid crystal display element of optical writing type, on which an image is pre-formed. Namely, the image is pre-formed by applying the laser beam L1 from the side of the glass substrate 11a (see FIG. 1) to the liquid crystal through a lens 21.

The ray of light passes from a light source 22 to the side of the glass substrate 11b (see FIG. 11b) through a lens 23, a mirror 24, and a lens 25. In an area where the liquid crystal molecules of the liquid crystal layer 17 (see FIG. 11) are kept in an original orientation, the incident light is scattered and does not reach the lens 25. On the screen 27, therefore, the area is in a dark state. On the other hand, in another area where the orientation of the liquid crystal molecules is varied, the corresponding part of the liquid crystal layer 17 (see FIG. 1) is made transparent, so that the incident light is reflected on the dielectric layer 16 (see FIG. 1). The reflected light is incident to a projection lens 26 through the lens 25 and is expansively projected on the screen 27. Hence, the image written in the liquid crystal display element 20 of optical writing type by the laser beam L1 is projected on the screen 27.

The liquid crystal display apparatus of projection type shown in FIG. 4 does not need a polarizing beam splitter which a liquid crystal display apparatus of projection type shown in FIG. 6 (to be described later) provides. The image projected on the screen 27 can be made brighter by the amount corresponding to this absence of the beam splitter.

Figure 5:
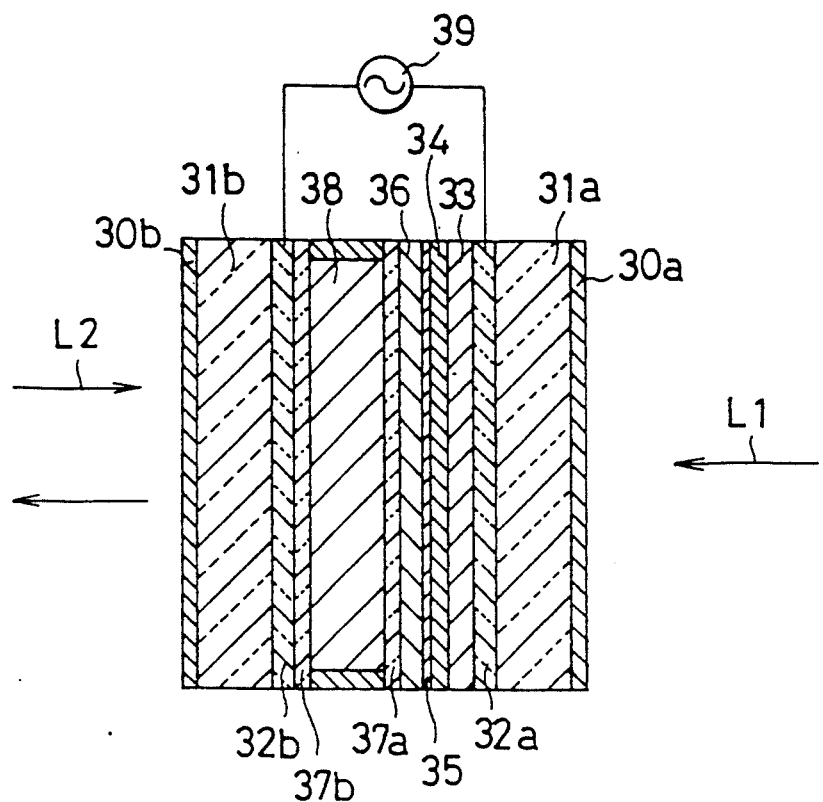
FIG. 5 is a sectional view showing a liquid crystal display element of optical writing type according to another embodiment of the present invention.

FIG. 5 is a sectional view showing a liquid crystal display element of optical writing type according to another embodiment of the present invention.

As shown, a liquid crystal display element of optical writing type is provided with a glass substrate 31a, and a transparent electrode film 32a. The transparent electrode film 32a includes layers of an ITO transparent conductive film and an $SnO_2$ transparent conductive film, which are formed on the glass substrate 31a by means of a sputtering technique.

The liquid crystal display element is also provided with a photoconductive layer 33, which is formed of a hydrogenated amorphous silicon (a-Si:H) with a film thickness of 3 $\mu$m, on the transparent electrode film 32a. The photoconductive layer 33 is formed by means of a plasma CVD technique using a silane gas ($SiH_4$), a methane gas ($CH_4$) and a hydrogen gas ($H_2$) as a material gas.

On the photoconductive layer 33, a light absorbing layer 34 is formed of coating material of carbon dispersed type, as one kind of organic pigment. The light absorbing layer 34 is formed by means of a spinner-coating technique using the coating material of carbon dispersed type, photo-polymerizing it by a light exposure, and then burning it for 1 hour at a burning temperature of 220° C. This coating material of the carbon dispersed type, is made by dispersing the carbon black into an acrylic resin, and is formed to be a film with a film thickness of about 1.5 $\mu$m, with a resistivity of about $10^7$ $\Omega$·cm, and with a transmittance of about 0.3% with respect to the visible light range.

As shown in FIGS. 2 and 3, the transmittance and the resistivity of this kind of coating material of the carbon dispersed type can be changed according to the amount of the dispersed carbon. Here, when it is used as a light absorbing layer, the transmittance is preferably not greater than 0.5% and the resistivity is not less than $10^6$ $\Omega$·cm.

In this embodiment, the organic pigment, carbon black, is used as a pigment. It is possible to employ an inorganic pigment having a larger resistivity ($\rho \geq 10^{11} \Omega$·cm). If the inorganic pigment is used, it is necessary to select the pigment according to the way of use, because the light screening characteristic is variable according to the light-screened range. For example, the black has a light shield characteristic of the overall visible range, the yellow and brown have a light shield characteristic of ~500 nm, the green has a light shield characteristic of 600 to 700 nm, and the blue has a light shield characteristic of 540 to 640 nm. As an inorganic material, the black material is formed of a combination of oxides of copper, chrome, iron, magnesium, and cobalt. The yellow material is formed of a combination of oxides of titanium, barium, nickel, antimony, and chrome. The brown material is formed of a combination of oxides of iron, zinc, titanium, chrome, nickel, and aluminium. The green material is formed of a combination of oxides of titanium, zinc, nickel, cobalt, aluminium, lithium, chrome and calcium. The blue material is formed of a combination of oxides of cobalt, aluminium, zinc, silicon, titanium, lithium, and chrome.

On the light absorbing layer 34, a leveling layer 35 is formed. The leveling layer 35 is formed by coating a protective film, semicoffine (Registered Trademark; product by Toray Ind., Inc.), one kind of polyimide, with a spinner, preliminarily sintering the coated film for ten minutes at 100° C., and sintering the coated film for one hour at 220° C. The thickness of the leveling layer 35 is about 1.0 μm. The leveling layer 35 may use an acrylic system or polysiloxane in place of polyimide. A hardening method employs a light hardening method in place of the heat hardening method.

On the leveling layer 35, a dielectric layer 36 is disposed. The dielectric layer 36 serves as a reflecting layer. The dielectric layer 36 is formed by alternately laminating silicon oxide ($SiO_2$) and titanium oxide ($TiO_2$) with an EB vapor-depositing technique. The thickness of the film is about 2 μm and the reflectivity is about 99%. Since the dielectric layer 16 is evaporated on the light absorbing layer 34, the temperature of the substrate should be preferably limited to 250° C. or lower, if possible, 200° C. or lower.

On the dielectric layer 36, an orientation film 37a is formed. The orientation film 37a is formed by spinner-coating a polyimide film and rubbing it as an molecular orientation treatment.

The orientation film 37a and an opposing layered body, which is formed of an orientation film 37b, a transparent electrode film 32b and a glass substrate 31b, are attached together with two spacers. This opposing layered body is formed as follows. Namely, the transparent electrode film 32b is formed of an ITO transparent conductive film on the glass substrate 31b by means of a spattering technique. Then, the orientation film 37b is formed on the transparent electrode film 32b, in the same manner as described above. The transparent electrode film 32b is formed on the glass substrate 31b by the spattering method.

The thickness of the space between the orientation films 37a and 37b is about 6 μm, to which a liquid crystal is introduced and packed to form a liquid crystal layer 38. As the liquid crystal for the liquid crystal layer 38, a phenyl cyclo-hexane type nematic liquid crystal is employed, so that about 10 wt % of a chiral material (S811 product by Merck Co., Inc.) is added to the nematic liquid crystal. As an operation mode for the liquid crystal display element of optical writing type, a phase transition mode is used.

On the outer surfaces of the glass substrates 31a and 31b, reflection preventing films 30a and 30b are respectively formed, in order to prevent the light reflection on these outer surfaces of the glass substrates 31a and 31b, by means of a vapor-depositing technique. The liquid crystal display element is adapted such that an alternating voltage can be applied between the transparent electrode films 32a and 32b by an alternating voltage source 39.

In a condition that the alternating voltage is supplied from the alternating voltage source 39, when a laser beam L1 is applied to the liquid crystal display element from the side of the glass substrate 31a, the impedance of the photoconductive layer 33 is reduced at an area that receives the laser beam L1, so that the alternating voltage supplied by the voltage source 39 is applied to the liquid crystal layer 38, and the orientation of the liquid crystal molecules is changed at this area. On the other hand, at another area which does not receive the laser beam L1, the impedance of the photoconductive layer 33 is not changed, so that the liquid crystal molecules in the liquid crystal layer 38 keep their original orientation condition. As a result, an image corresponding to the laser beam L1 as the writing light, is formed in the liquid crystal layer 38.

In the above mentioned embodiment, the acrylic resin is utilized as the coating material of the carbon dispersed type for the light absorbing layer 34. A polyamide or a polyimide can be utilized as a photo-polymerizing type, and an epoxy resin can be utilized as a heat-polymerizing type for the light absorbing layer 34.

As a liquid crystal display mode for the nematic liquid crystal as in the liquid crystal layer 34 of the present embodiment, any one of a twisted nematic mode, an electric field effect induction birefrigence mode and a hybrid field effect mode can be utilized. As the liquid crystal for the liquid crystal layer 34, a ferroelectric liquid crystal, anti-ferroelectric liquid crystal, or a smectic liquid crystal having an electroclinic effect, can be utilized in place of the nematic liquid crystal of the present embodiment.

Figure 6:
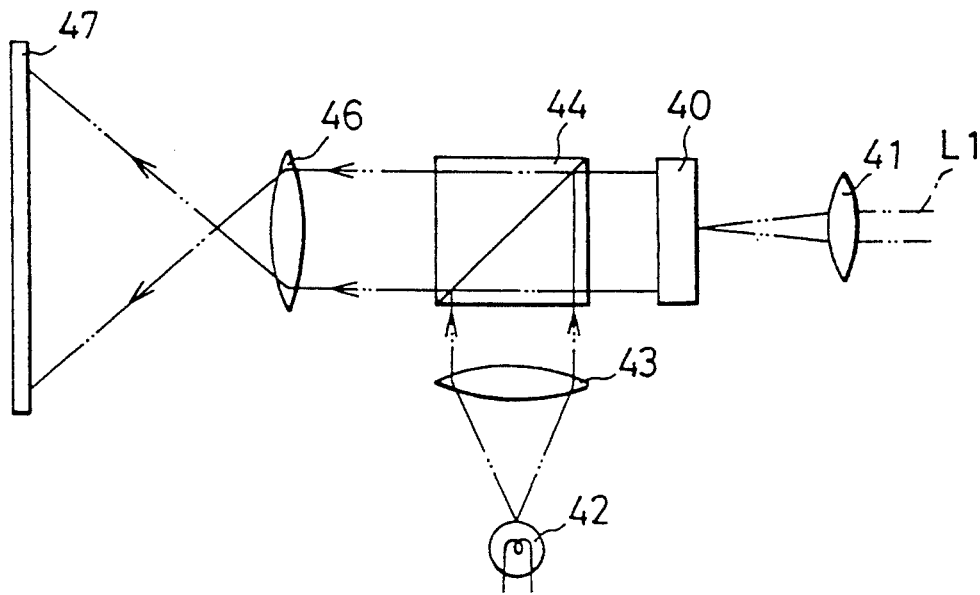
FIG. 6 is a schematic block diagram showing a projection type display apparatus to which the liquid crystal display element of optical writing type shown in FIGS. 5 and 8 is used as a light modulator.

FIG. 6 is a schematic view showing a liquid crystal display apparatus of projection type in which the liquid crystal display element of optical writing type shown in FIG. 5 is used as a light modulator.

As shown, 40 designates a liquid crystal display element of optical writing element, on which an image is formed in advance as mentioned above. Namely, the image forming process is performed in advance by applying the laser beam L1 from the side of the glass substrate 31a (see FIG. 5) through a lens 41.

At this condition, a projection light as a reading light from a light source 42 is applied to the liquid crystal element 40 from the side of the glass substrate 31b (see FIG. 5). At the area of the liquid crystal layer 38 (see FIG. 5) where the orientation of the liquid crystal molecules is kept in its original state, since the polarization direction is not changed with respect to this applied light, the light reflected from the dielectric layer 36 (see FIG. 5) does not pass through the polarizing beam splitter 44, so that the area on the screen 47 corresponding to this area becomes in a dark condition. On the other hand, light passing through an area of the liquid crystal layer 38 (see FIG. 5) where the orientation of the liquid crystal molecules is changed will have its polarization direction changed due to the electric optical effect. When this light has been reflected from the liquid crystal display element 40, it will pass through the beam splitter 44 to a projection lens 46, and is magnified there. Consequently, the image written in the liquid crystal element 40 is projected on the screen 47.

Figure 7:
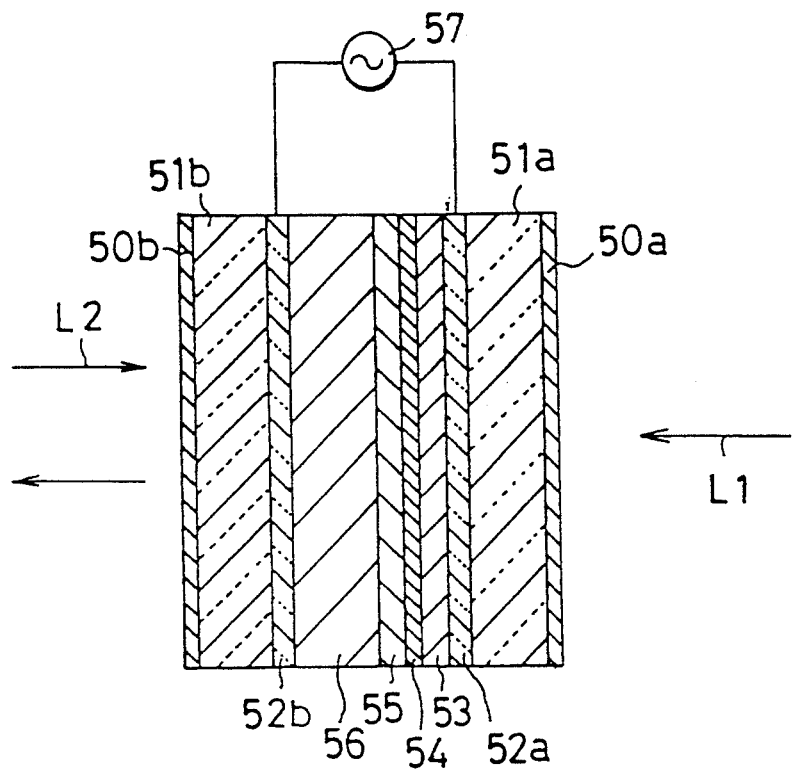
FIG. 7 is a sectional view showing a liquid crystal display element of optical writing type according to another embodiment of the present invention.

FIG. 7 is a sectional view showing a liquid crystal display element of optical writing type according to another embodiment of this invention.

As shown, the liquid crystal display element of optical writing type is provided with a glass substrate 51a, and a transparent electrode film 52a. The transparent electrode film 52a includes layers of an ITO transparent conductive film and an $SnO_2$ transparent conductive film, which are formed on the glass substrate 51a by means of a sputtering technique.

On the transparent electrode film 52a, a photoconductive layer 53 is disposed. The layer 53 is formed of a hydrogenated amorphous silicon (a-Si:H) with a film thickness of about 3 μm. The photoconductive layer 53 is formed by means of a plasma CVD technique using a silane gas ($SiH_4$) and a hydrogen gas ($H_2$) as a material gas. In place of a-Si:H, the photoconductive layer 53 may employ a hydrogenated amorphous silicon carbide (a-SiC:H). The film of a-SiC:H can be formed by means of the plasma CVD technique using a silane gas ($SiH_4$), a methane gas ($CH_4$), and a hydrogen gas ($H_2$) as a material gas.

On the photoconductive layer 53, a light absorbing layer 54 is disposed. The layer 54 is formed of coating material of carbon dispersed type, as one kind of organic pigment.

This coating material of the carbon dispersed type may use a protective film semicoffine (Registered Trademark; product by Toray Ind., Inc.), which is one kind of polyimide, an acrylic resin having carbon dispersed therein, or polysiloxane, for example. The light absorbing layer 54 made in this embodiment has a thickness of about 4 μm and a photopermeability of about 0.5% with respect to the visible light range. The layer may have a thinner thickness by selecting the dispersing method.

In this embodiment, the organic pigment, carbon black, is used as a pigment. It is possible to employ an inorganic pigment having a larger resistivity ($\rho \geq 10^{11} \Omega$ cm). If the inorganic pigment is used, it is necessary to select the pigment according to the way of use, because the light screening characteristic is variable according to the light-screened range. For example, the black has a light shield characteristic of the overall visible range, the yellow and brown have a light shield characteristic of ~500 nm, the green has a light shield characteristic of 600 to 700 nm, and the blue has a light shield characteristic of 540 to 640 nm. As an inorganic material, the black material is formed of a combination of oxides of copper, chrome, iron, magnesium, and cobalt. The yellow material is formed of a combination of oxides of titanium, barium, nickel, antimony, and chrome. The brown material is formed of a combination of oxides of iron, zinc, titanium, chrome, nickel, and aluminium. The green material is formed of a combination of oxides of titanium, zinc, nickel, cobalt, aluminium, lithium, chrome and calcium. The blue material is formed of a combination of oxides of cobalt, aluminium, zinc, silicon, titanium, lithium, and chrome.

On the light absorbing layer 54, a dielectric layer 55 is formed. This layer 55 serves as a light reflecting mirror. The dielectric layer 55 can be formed by alternately laminating silicon oxide ($SiO_2$) and titanium oxide ($TiO_2$) with an EB vapor-depositing method. The thickness of the film is about 2 μm and the reflectivity is about 99%. Since the dielectric layer 55 is evaporated on the light absorbing layer 54, the temperature of the substrate should be preferably limited to 250° C. or lower, if possible, 200° C. or lower.

On the dielectric layer 55, a liquid crystal layer 56 is disposed. As the liquid crystal layer 56, a scattering type liquid crystal compound film is utilized here. This liquid crystal compound film is formed as follows. Namely, a homogeneous solution is made by mixing 30 w % of bifunctional acrylate (HX-620 product by Nippon Kayaku Co., Ltd.) which is a UV (ultraviolet) polymerization compound, 70 wt % of nematic liquid crystal ZL1-3201-000 product by Merck Co., Inc.), and a small amount of polymerization initiator (Darocure 1173 product by Merck Co., Inc.), and is filtered. Then, the filtered solution is spinner-coated onto the light reflecting layer 25 with a film thickness of 10 μm, and is exposed by ultra-violet ray so as to photo-polymerize it.

On the liquid crystal layer 56, an opposing layered body of a transparent electrode film 52b and a glass substrate 51b is disposed. This opposing layered body is formed as follows. Namely, the transparent electrode film 52b is formed of an ITO transparent conductive film on the glass substrate 51b by means of a sputtering technique.

On the outer surface of the glass substrates 51a and 51b, reflection preventing films 50a and 50b are respectively formed, in order to prevent the light reflection on these outer surfaces of the glass substrates 51a and 51b by means of a vapor-depositing technique. The liquid crystal display element is adapted such that an alternating voltage can be applied between the transparent electrode films 52a and 52b by an alternating voltage source 57.

In a condition that this alternating voltage is supplied from the voltage source 57, when a laser beam L1 is applied to the input crystal display element from the side of the glass substrate 51a, the impedance of the photoconductive layer 53 is reduced at an area that receives the laser beam L1, so that the alternating voltage supplied by the voltage source 57 is applied to the liquid crystal layer 56, and the orientation of the liquid crystal molecules is changed at this area. On the other hand, at another area that does not receive the laser beam L1, the impedance of the photoconductive layer 53 is not changed, so that the liquid crystal molecules in the liquid crystal layer 56 keep its original orientation. As a result, an image corresponding to the laser beam L1 as the writing light is formed in the liquid crystal layer 56.

As a liquid crystal display mode of the liquid crystal layer 56, any one of a dynamic scattering mode and a guest host mode can be utilized in place of the liquid crystal compound film described in this embodiment. As a liquid crystal display mode for the nematic liquid crystal as in the liquid crystal layer 56 of the present embodiment, the guest host mode can be utilized. Further, the substrate 51a may utilize a fiber plate composed of optical fibers.

The liquid crystal display element of optical writing type shown in FIG. 7 may apply to the liquid crystal display apparatus of projection type shown in FIG. 4.

Figure 8:
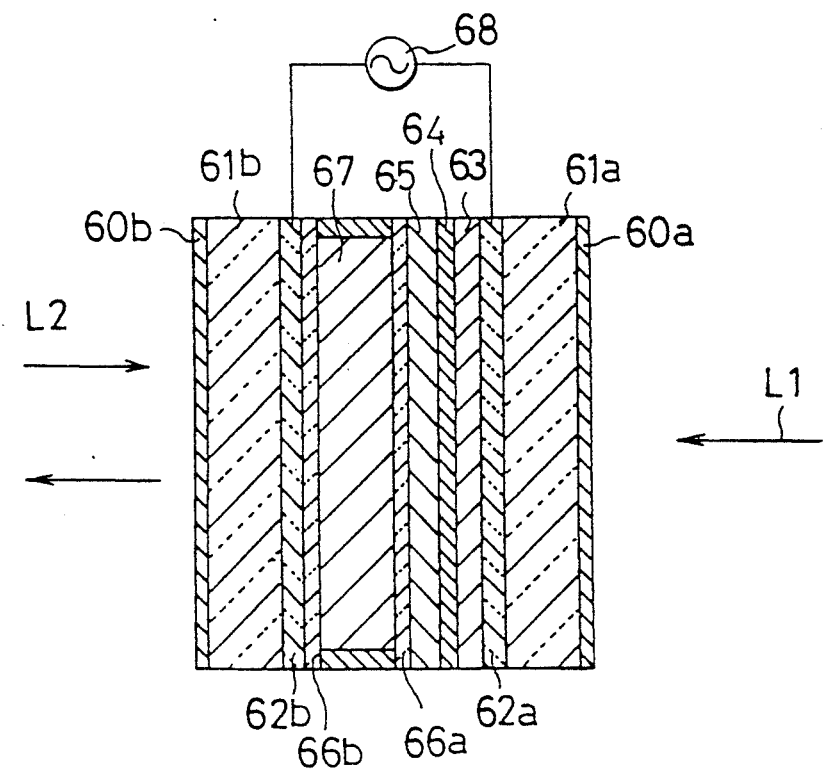
FIG. 8 is a sectional view showing a liquid crystal display element of optical writing type according to another embodiment of the present invention.

FIG. 8 is a sectional view showing a liquid crystal display element of optical writing type according to another embodiment of this invention.

As shown, the liquid crystal display element of optical writing type is provided with a glass substrate 61a, and a transparent electrode film 62a. The transparent electrode film 62a includes layers of an ITO transparent conductive film and an $SnO_2$ transparent conductive film, which are formed on the glass substrate 61a by means of a sputtering technique.

On the transparent electrode film 62a, a photoconductive layer 63 is disposed. The layer 63 is formed of a hydrogenated amorphous silicon (a-Si:H) with a film thickness of about 3 μm. The photoconductive layer 63 is formed by means of a plasma CVD technique using a silane gas ($SiH_4$) and a hydrogen gas ($H_2$) as a material gas. In place of a-Si:H, the photoconductive layer 63 may employ a hydrogenated amorphous silicon carbide (a-SiC:H). The film of a-SiC:H can be formed by means of the plasma CVD technique using a silane gas ($SiH_4$), a methane gas ($CH_4$), and a hydrogen gas ($H_2$) as a material gas.

On the photoconductive layer 63, a light absorbing layer 64 is disposed. The layer 64 is formed of coating material of carbon dispersed type, as one kind of organic pigment.

This coating material of the carbon dispersed type may use a protective film semicoffine (Registered Trademark; product by Toray Ind., Inc.), which is one kind of polyimide, an acrylic resin having carbon dispersed therein, or polysiloxane, for example. The light absorbing layer 64 made in this embodiment has a thickness of about 4 μm and a transmittance of about 0.5% with respect to the visible light range. The layer may have a thinner thickness by selecting the dispersing method.

In this embodiment, an organic pigment, carbon black, is used as a pigment. It is possible to employ an inorganic pigment having a larger resistivity ($\rho \geq 10^{11} \Omega \cdot cm$). If the inorganic pigment is used, it is necessary to select the pigment according to the way of use, because the light screening characteristic is variable according to the light-screened range. For example, the black has a light shield characteristic of the overall visible range, the yellow and brown have a light shield characteristic of ~500 nm, the green has a light shield characteristic of 600 to 700 nm, and the blue has a light shield characteristic of 540 to 640 nm. As an inorganic material, the black material is formed of a combination of oxides of copper, chrome, iron, magnesium, and cobalt. The yellow material is formed of a combination of oxides of titanium, barium, nickel, antimony, and chrome. The brown material is formed of a combination of oxides of iron, zinc, titanium, chrome, nickel, and aluminum. The green material is formed of a combination of oxides of titanium, zinc, nickel, cobalt, aluminum, lithium, chrome and calcium. The blue material is formed of a combination of oxides of cobalt, aluminum, zinc, silicon, titanium, lithium, and chrome.

On the light absorbing layer 64, a dielectric layer 65 is formed. This layer 65 serves as a light reflecting mirror. The dielectric layer 65 can be formed by alternately laminating silicon oxide ($SiO_2$) and titanium oxide ($TiO_2$) with an EB vapor-depositing technique. The thickness of the film is about 2 μm and the reflectivity is about 99%. Since the dielectric layer 65 is evaporated on the light absorbing layer 64, the temperature of the substrate should be preferably limited to 250° C. or lower, if possible, 200° C. or lower.

On the dielectric layer 65, an orientation film 66a is formed. The orientation film 66a is formed by spinner-coating a polyimide film and rubbing it as an molecular orientation treatment.

The orientation film 66a and an opposing layered body, which is formed of an orientation film 66b, a transparent electrode film 62b and a glass substrate 61b, are attached together with two spacers. This opposing layered body is formed as follows. Namely, the transparent electrode film 62b is formed of an ITO transparent conductive film on the glass substrate 61b by means of a spattering techhique. Then, the orientation film 66b is formed on the transparent electrode film 62b, in the same manner as described above. The transparent electrode film 62b is formed on the glass substrate 61b by means of the spattering technique.

The thickness of the space between the orientation films 66a and 66b is about 6 μm, to which a liquid crystal is introduced and packed to form a liquid crystal layer 67. As the liquid crystal for the liquid crystal layer 67, a phenyl cyclo-hexane type nematic liquid crystal is employed, so that about 10 wt % of a chiral material (S811 made by Merck Co., Inc., for example) is added to the nematic liquid crystal. As an operation mode for the liquid crystal display element of optical writing type, a phase transition mode is used.

On the outer surfaces of the glass substrates 61a and 61b, reflection preventing films 60a and 60b are respectively evaporated, in order to prevent the light reflection on these outer surfaces of the glass substrates 61a and 61b. The liquid crystal display element is adapted such that an alternating voltage can be applied between the transparent electrode films 62a and 62b by an alternating voltage source 68.

In a condition that this alternating voltage is supplied from the voltage source 68, when a laser beam L1 is applied to the liquid crystal display element from the side of the glass substrate 61a, the impedance of the photoconductive layer 63 is reduced at an area that receives the laser beam L1, so that the alternating voltage is applied to the liquid crystal layer 67, and the orientation of the liquid crystal molecules is changed at this area. On the other hand, at another area that does not receive the laser beam L1, the impedance of the photoconductive layer 63 is not changed, so that the liquid crystal molecules in the liquid crystal layer 67 keeps their original orientation. As a result, an image corresponding to the laser beam L1 as the writing light is formed in the liquid crystal layer 67.

In the above mentioned embodiment, the acrylic resin is utilized as the coating material of the carbon dispersed type for the light absorbing layer 64. A polyimide or a polyamide can be utilized as a photo-polymerizing type, and an epoxy resin can be utilized as a heat-polymerizing type for the light absorbing layer 64.

As a liquid crystal display mode for the nematic liquid crystal as in the liquid crystal layer 67 of the present embodiment, any one of a twisted nematic mode, an electric field effect induction birefringence mode and a hybrid field effect mode can be utilized in place of the phase transition mode of this embodiment. As the liquid crystal for the liquid crystal layer 67, a ferroelectric liquid crystal, an anti-ferroelectric liquid crystal, or a smectic liquid crystal having an electroclinic effect may be utilized.

The liquid crystal display element of optical writing type shown in FIG. 8 may apply to the liquid crystal display apparatus of projection type shown in FIG. 6.

Many widely different embodiments of the present invention may be constructed without departing from the spirit and scope of the present invention. It should be understood that the present invention is not limited to the specific embodiments described in the specification in the appended claims.

What is claimed is:

1. A liquid crystal display element of optical writing type, comprising:
   a first transparent substrate;
   a first transparent electrode layer formed on said first transparent substrate;
   a photoconductive layer formed on said first transparent electrode layer;
   a light absorbing layer formed on said photoconductive layer, said layer being formed of pigment dispersed in an organic material;
   a leveling layer formed on said light absorbing layer, said leveling layer being not more than 1.5 μm in thickness;
   a dielectric layer formed on said light absorbing layer;
   a second transparent substrate;

a second transparent electrode layer formed on said second transparent substrate; and a liquid crystal layer sealed between said second transparent electrode layer and said dielectric layer;

wherein said pigment contained in said light absorbing layer is inorganic pigment having a larger resistivity than $10^{11} \Omega$ cm.

2. A liquid crystal display element according to claim 1, wherein said organic material is a photo-polymerizing material or a heat-polymerizing material.

3. A liquid crystal display element according to claim 2, wherein said organic material is an acrylic resin, polyimide, polyamide, an epoxy resin or a melamine resin.

4. A liquid crystal display element according to claim 1, further comprising a first orientation film formed on said dielectric layer and a second orientation film formed on the second transparent electrode film.

5. A liquid crystal display element according to claim 4, further comprising a pair of spacers through which the combination of said first transparent substrate, said first transparent electrode layer, said photoconductive layer, said light absorbing layer, said leveling layer, and said dielectric layer, and said first orientation film is attached to the combination of said second transparent substrate, said second transparent electrode layer, and said second orientation film with said liquid crystal layer being located therebetween.

6. A liquid crystal display element according to claim 5, wherein said liquid crystal layer is formed of a phenylcyclohexane type nematic liquid crystal mixed with chiral material.

7. A liquid crystal display element according to claim 1, further comprising an a.c. power source for applying an a.c. voltage between said transparent electrode films.

8. A liquid crystal display element according to claim 1, wherein said first and second transparent substrates are glass substrates.

9. A liquid crystal display element according to claim 8, wherein reflection preventing film is vapor-deposited on the outer side of each of said first and second glass substrates.

10. A liquid crystal display element according to claim 1, wherein said liquid crystal layer is formed of a liquid crystal compound film.

11. A liquid crystal display element according to claim 1, wherein said liquid crystal layer uses any one of a dynamic scattering mode or a guest host mode.

12. A liquid crystal display element according to claim 11, wherein said liquid crystal layer is formed of nematic liquid crystal.

13. A liquid crystal display element according to claim 1, wherein said liquid crystal layer is formed of nematic liquid crystal and uses any one of the phase transition mode, a twisted nematic mode, an electric field effect induced birefringence mode, or a hybrid field effect mode.

14. A liquid crystal display element according to claim 1, wherein said liquid crystal layer is formed of a ferroelectric liquid crystal, an anti-ferroelectric liquid crystal, or a smectic liquid crystal having an electroclinic effect.

15. A liquid crystal display element according to claim 1, wherein said first transparent electrode is formed of an ITO transparent conductive film and an $SnO_2$ transparent conductive film and said second transparent electrode is formed of an ITO transparent conductive film.

16. A liquid crystal display element according to claim 1, wherein said photoconductive layer is formed of hydrogenated amorphous silicon or hydrogenated amorphous silicon carbide.

* * * * *